(12) United States Patent
Allen

(10) Patent No.: US 8,654,019 B2
(45) Date of Patent: Feb. 18, 2014

(54) POWER APERTURE LINEARIZATION

(75) Inventor: Edward H. Allen, Bethesda, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 307 days.

(21) Appl. No.: 13/050,901

(22) Filed: Mar. 17, 2011

(65) Prior Publication Data

US 2012/0235869 A1 Sep. 20, 2012

(51) Int. Cl.
*H01Q 1/24* (2006.01)

(52) U.S. Cl.
USPC ............................... 343/720; 713/300

(58) Field of Classification Search
USPC ............................... 343/720; 713/300
See application file for complete search history.

(56) References Cited

U.S. PATENT DOCUMENTS

2009/0276639 A1* 11/2009 Saha et al. ................... 713/300

OTHER PUBLICATIONS

Service, Robert F., "Temperature Rises for Devices That Turn Heat Into Electricity," Thermoelectrics, Oct. 29, 2004, vol. 306, pp. 806-807, www.sciencemag.org.
DiMatteo, et al., "Enhanced Photogeneration of Carriers in a Semiconductor Via Coupling Across a Nonisothermal Nanoscale Vacuum Gap," Applied Physics Letters, Sep. 17, 2001, vol. 79, No. 12, pp. 1894-1896.
Pendry, J.B., "Radiative Exchange of Heat Between Nanostructures," J.Phys: Condens. Matter 11 (1999) pp. 6621-6633.
Sales, Brian C., "Filled Skutterudites," Handbook on the Physics and Chemistry of the Rare Earths, Solid State Division, Oak Ridge National Laboratory, Oct. 2002, pp. 1-52.

* cited by examiner

*Primary Examiner* — Karl D Frech
(74) *Attorney, Agent, or Firm* — McDermott Will & Emery LLP

(57) ABSTRACT

Antennas systems are disclosed providing for the use of heat harvesters such as thermophotovoltaic cell materials for converting waste heat from antenna transmitters into useful electricity. A further aspect of the present disclosure provides for transmitters that include high-temperature solid-state power amplifiers for operation at relatively high temperatures, reducing or eliminating the need for thermal heat spreaders or heat sinks. Quantum-effect thermophotovoltaic cells, including quantum-dot based thermophotovoltaic cells are described. Field-coupling is described to extract energy from a quantum-dot based TPV. Novel solar cells are also disclosed.

33 Claims, 4 Drawing Sheets

$$\eta_{sys} = \frac{\eta_{MMIC}}{\left[1 + \eta_{TPV} \cdot (\eta_{MMIC} - 1)\right]}$$

POWER APERTURE LINEARIZATION

BACKGROUND

Arrays of antennas, or array antennas, are used in many different applications, including radar systems. The principle figure of merit of an array antenna, is its signal to noise ratio, which is given by the radar range equation:

$$\frac{S}{N} = \frac{P_T G_T}{4\pi R^2} \cdot \frac{\sigma}{4\pi R^2} \cdot \frac{A}{L k_b T B}, \qquad \text{EQ. 1}$$

where S=instantaneous signal power, N=noise power, $P_T$=peak transmit power, GT=transmit antenna gain, R=range to target, σ=target radar cross section, A=antenna aperture area, L=losses, $k_b$=Boltzmann's constant, T=effective receive noise temperature, and B=noise bandwidth.

A strategy for improving radar merit is to increase transmit power, $P_T$. Increasing aperture size, A, is another strategy for increasing the signal to noise ratio of an array antenna. Increasing aperture size, while equally effective, can have practical limits especially in airborne applications because of the limited space and mass/weight restrictions. For example, high altitude airships typically have very strict limits on mass and every effort to reduce the mass of the antenna must be made; though the power consumed by an antenna often has an indirect impact effect on airship mass that is many times its direct contribution.

Real antennas have been shown to reach a minimum power and mass as aperture is increased. FIG. 1 depicts a graph 100 showing such a relationship for one previous study. The non-linear behavior indicated is believed to stem from at least two factors: (1) receiver power per antenna element remaining constant as aperture area is increased; and, (2) the mass of required cooling equipment (especially heat spreader mass) falling more slowing than the amount of power as aperture area is increased.

SUMMARY

Embodiments of the present disclosure are directed to systems and methods that can facilitate preventing the power aperture curve, such as shown in FIG. 1, from reversing its downward trend at a minimum value as aperture increases. Preventing that reversal may allow for a substantial, and potentially indefinite, increase in aperture and decrease in power, which may greatly improve the radar of a large array, whether on an airship, on the ground, on a water craft, or in space.

An aspect of the present disclosure provides for the use of heat harvesters such as thermophotovoltaic cells for converting waste heat from antenna transmitters into electricity.

A further aspect of the present disclosure provides for transmitters that include high-temperature solid-state power amplifiers for operation at relatively high temperature.

An exemplary embodiment includes an antenna system including a transmit module configured to transmit RF energy of a selected frequency bandwidth; and a heat harvester including a thermophotovoltaic (TPV) material configured to receive waste heat form the transmit module and convert the waste heat to electricity.

It should be noted than any of the aspects described in the paragraphs that follow may be combined in any combination and added to the above exemplary embodiment to modify the embodiment accordingly.

The TPV can include a quantum-effect material.

The quantum-effect material can include a quantum dot (QD)-based material and/or a carbon-based material such as carbon nanotubes or graphene.

The QD-based material can also include a quantum dot superlattice including an alloy of lead, selenium, and tellurium in layers of lead telluride.

The QD-based material can include a plurality of groupings of quantum dots, wherein each grouping is configured to resonate at microwave frequencies and each quantum dot of a respective grouping is configured to resonate at infrared frequencies.

The transmit module can include a monolithic microwave integrated circuit (MMIC).

The MMIC can include a high-temperature semiconductor.

The high-temperature semiconductor can include silicon carbide (SiC).

The high-temperature semiconductor can include aluminum nitride (AlN).

The high-temperature semiconductor can include gallium nitride (GaN).

The high-temperature semiconductor can include indium nitride (InN).

The antenna system can include a plurality of antenna elements having a combined aperture area, A.

The antenna system can include a photonic crystal is disposed between the transmit module and the TPV.

The wherein the photonic crystal can include tungsten.

The photonic crystal can include a stacked array of tungsten elements

The antenna system can include a receive module configured to receive radiation of a selected frequency bandwidth.

The antenna system can include a cooling unit configured to cool the receiver module.

The cooling unit can be configured to receive power from the TPV.

The cooling unit can include a Peltier cooler.

An exemplary embodiment includes an array antenna system including a plurality of radiators configured to transmit RF energy of a selected frequency bandwidth; a transmit module configured to provide RF energy of a selected frequency bandwidth to the plurality of radiators; a receive module including a cooling unit and configured to receive RF radiation of a selected frequency bandwidth from the plurality of radiators, wherein the cooling unit is configured to cool the receive module; and a heat harvester including a thermophotovoltaic (TPV) material configured to (i) receive waste heat form the transmit module and convert the waste heat to electricity, and (ii) provide the resulting electricity to the cooling unit.

It should be noted than any of the aspects described in the paragraphs that follow may be combined in any combination and added to the above exemplary embodiment to modify the embodiment accordingly.

The TPV material can include a quantum-effect material.

The quantum-effect material can include a quantum dot (QD)-based material and/or a carbon-based system such as nanotubes or graphene.

The QD-based material can include a quantum dot superlattice including an alloy of lead, selenium, and tellurium in layers of lead telluride.

The QD-based material can include a plurality of groupings of quantum dots, wherein each grouping is configured to resonate at microwave frequencies and each quantum dot of a respective grouping is configured to resonate at infrared frequencies.

The transmit module can include a monolithic microwave integrated circuit (MMIC).

The MMIC can include a high-temperature semiconductor.

The high-temperature semiconductor can include silicon carbide (SiC).

The high-temperature semiconductor can include aluminum nitride (AlN).

The high-temperature semiconductor can include gallium nitride (GaN).

The high-temperature semiconductor can include indium nitride (InN).

A further exemplary embodiment can include a solar cell including a photodiode configured to (i) received infrared radiation of a selected frequency bandwidth and convert the infrared radiation to electricity, and (ii) transmit RF energy of a selected frequency bandwidth; and a RF reflector as a resonant cavity and configured to reflect RF energy from the photodiode, wherein the RF reflector is transparent to infrared radiation.

The photodiode of the solar cell can include or be used with a QD-based material comprising a plurality of groupings of quantum dots, wherein each grouping is configured to resonate at microwave frequencies and each quantum dot of a respective grouping is configured to resonate at infrared frequencies.

These, as well as other components, steps, features, objects, benefits, and advantages of the present disclosure, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
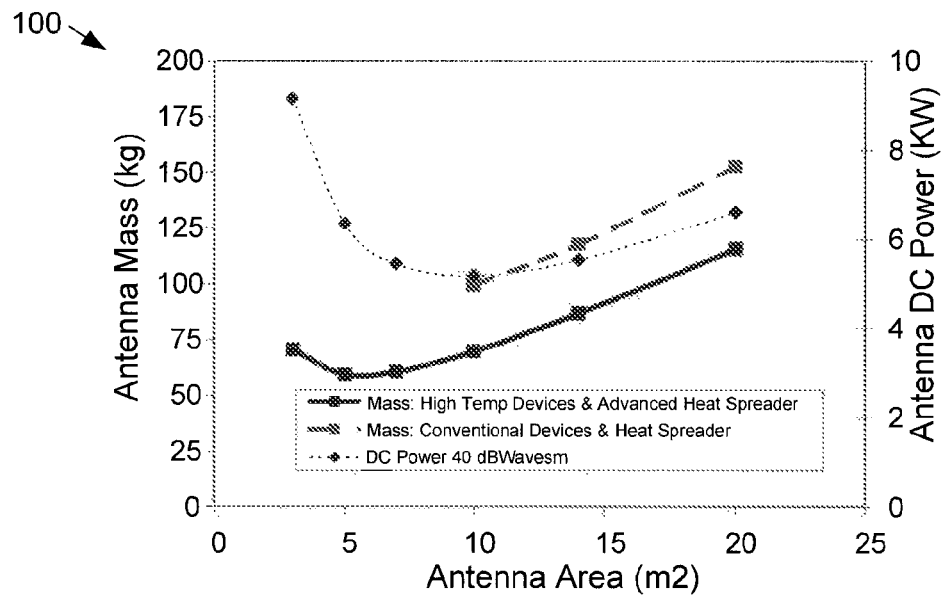
FIG. 1 depicts a graph of power and mass in relation to antenna aperture size for a previous study.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Generally, and in broad terms, an aspect of the present disclosure provides for the use of heat harvesters such as thermophotovoltaic cell materials or cells (TPVs) for converting waste heat from antenna transmitters into useful electricity. A further aspect of the present disclosure provides for transmitters that include high-temperature solid-state power amplifiers for operation at relatively high temperatures, reducing or eliminating the need for thermal heat spreaders or heat sinks.

Embodiments of the present disclosure are directed to systems and methods for providing power aperture linearization allowing for an increase in aperture size and a corresponding reduction in aperture power, facilitating a reduction in antenna system mass. Embodiments of the present disclosure can facilitate preventing the power aperture curve (e.g., in accordance with FIG. 1 and EQ. 1) from reversing its downward trend at a minimum value as aperture size is increased. Thus, by providing for such an increase in aperture and decrease in power, the radar signal to noise ration can be greatly improved for, e.g., relatively large antennas arrays, whether implemented on an airship, on the ground, or in space.

Figure 2:
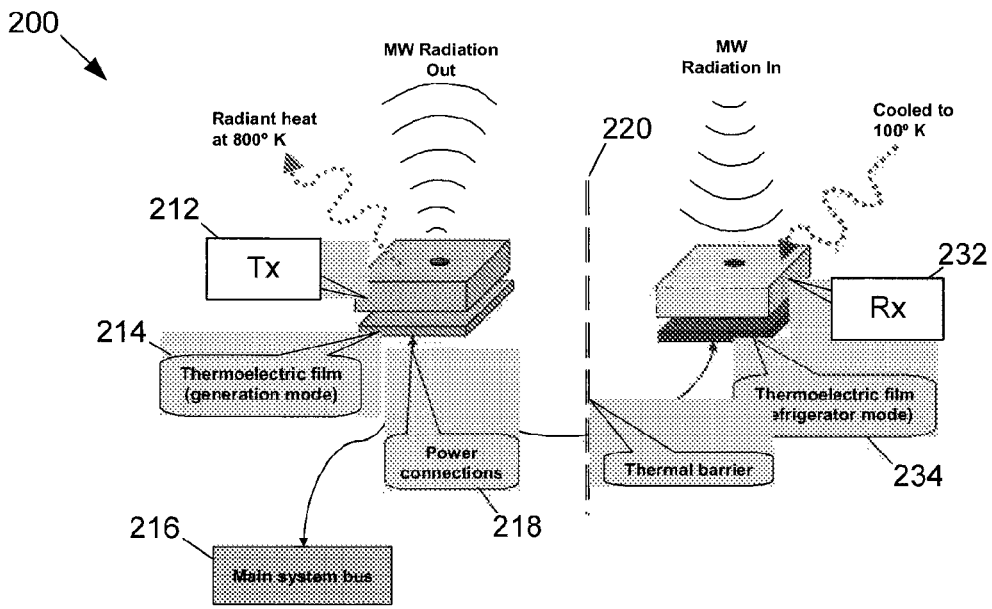
FIG. 2 depicts a schematic diagram of a radar transmit-receive system, in accordance with an exemplary embodiment of the present disclosure.

FIG. 2 depicts a diagram of a transmit-receive (TR) system 200, in accordance with exemplary embodiments of the present disclosure. System 200 can include a transmit (Tx) module 212 that is configured to transmit RF energy, e.g., microwave radiation at a desired band such as X-band, K-band, etc. System 200 can also include a receive (Rx) module 232 that is configured to receive incident RF energy, e.g., reflected portions of the transmitted RF energy. A thermal barrier 220 may be positioned between the transmit module 212 and the receive module 232. A TPV 214, e.g., in the form of a thermoelectric film as shown, can be positioned adjacent to the transmit module 212 to transform a portion of the waste heat generated by the transmit module 212 into useful electricity. The TPV 214 may be connected by power connections 218 to a main system bus 216 and/or an active cooler or cooling unit 234, e.g., in the form of a thermoelectric film acting as a Peltier cooler as shown, positioned adjacent the receive module 232. In exemplary embodiments, system 200 can be implemented as a radar Monolithic Microwave Integrated Circuit (MMIC), as described in further detail below for the other figures.

Transmit module 212 can include suitable solid state power amplifiers for RF power generation. Exemplary embodiments of the present disclosure may utilize monolithic microwave integrated circuits (MMICs), including high-temperature semiconductor materials or alloys, for transmitter or power amplifier components. As a general consideration for such high-temperature materials, it may be desirable to select materials that have as wide a band gap as possible (there may be some exceptions, of course) because the band gap tends to narrow with temperature; wide band gap materials tend to be high temperature materials. Suitable high-temperature semiconductor materials include, but are not limited to, silicon carbide (SiC), aluminum nitride (AlN), gallium nitride (GaN), diamond, boron nitride, and/or indium nitride (InN); other suitable high-temperature semiconductor materials may of course be used. The scope of the present disclosure is not limited to only those high-temperature semiconductors available but also includes use of new high-temperature semiconductor materials as such become available.

As shown in FIG. 2, for an antenna transmitter such as employed for an array antenna, the transmit and receive functions can be separated thermally and the transmit function (e.g., of transmit module 212) operated at a high enough temperature (e.g., 600° K-800° K) to achieve thermal equilibrium by radiation. Doing so can alleviate the need for and attendant mass of a heat spreader system. Such thermal separation can also allow the receiver (e.g., receive module 232) to be actively cooled, reducing its noise and power levels substantially. The scavenged power can be used locally, for example, to drive a suitable active (e.g., Peltier) cooler for the receive module, in exemplary embodiments. As signal-to-noise ratios (SNR) are directly proportional to power-aperture product but inversely proportional to receiver temperature and noise bandwidth, reducing receiver temperature can boost SNR. Such cooling can allow for a reduction in receiver power, along with a reduction in transmit power, as system aperture size is increased. Because the waste heat from the transmitter (e.g., transmit module 212) can be shed at a relatively high temperature relative to ambient conditions, the temperature differential can facilitate conversion of a large portion of the waste heat back into useful power. Nanotechnology-based solid-state thermoelectric devices, such as TPVs, including quantum-dot based TPVs, can transform a relatively large portion (e.g., 40+%) of the heat into DC power.

As an example of the increases in efficiency afforded by embodiments of the present disclosure, an inexpensive microwave semi-conductor transmitter may radiate 80% of the input power as heat. By providing a heat harvester, according to the present disclosure, and converting 40% of that energy loss into useful electricity, the net efficiency of the transmitter would be raised to 52%. A heat harvester according to the present disclosure, e.g., a TPV in the form of TE-layers shown in FIG. 2, when added to a microwave transmitter chip would only add negligible weight and minor cost while potentially reducing net transmit power consumption by, e.g., a third.

While MMICS utilizing high-temperature semiconductors may operate at high temperature, most of the energy consumed by a MMIC is lost as waste heat. Typically, MMICs are seldom more than 20% efficient except in ideal laboratory conditions where they might reach 40% or so. The heat radiated from a MMIC may be harvested by a TPV, turned back into electric power and recycled back into the main power bus of a transmitting or TR system. One result of such harvesting or recycling of waste heat, as shown in FIG. 3, is to raise the effective efficiency of the system above that of the MMIC standing alone.

Figure 3:
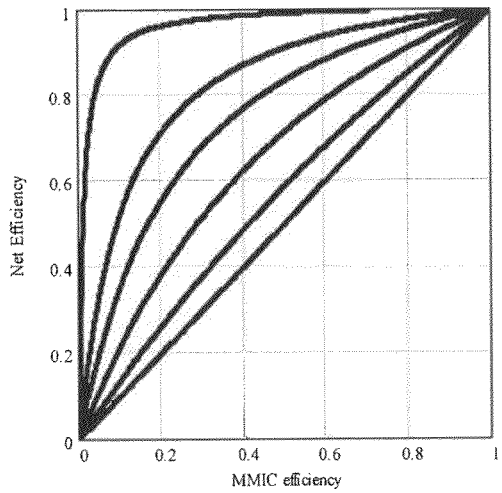
FIG. 3 depicts a graph and related equation for the system efficiency of a MMIC radar transmit-receive system utilizing a TPV, in accordance with an exemplary embodiment of the present disclosure.

FIG. 3 depicts a graph 300 and related equation for the system efficiency of a radar transmit-receive system, in accordance with an exemplary embodiment of the present disclosure. Embodiments of the present disclosure can have system efficiencies in accordance with the equation set forth and graph of FIG. 3:

$$\eta_{SYS} = \frac{\eta_{MMIC}}{[1 + \eta_{TPV}(\eta_{MMIC} - 1)]}, \quad \text{EQ. 2}$$

where $\eta_{SYS}$=the system efficiency, $\eta_{MMIC}$=the MMIC efficiency, and $\eta_{TPV}$=the TPV efficiency.

As shown in FIG. 3 and indicated by EQ. 2, the effective efficiency can be increased, e.g., to near unity, even with a low MMIC efficiency, provided the efficiency of a related TPV is sufficient. Embodiments of the present disclosure provide for a way to raise the efficiency of transmitter (e.g., radar transmit module implemented in a MMIC) and TPV system by utilizing TPV materials that have nano-sized structures producing thermoelectric effects attributable to quantum mechanics, or quantum-effect materials, e.g., quantum-dot based TPVs, as described below.

The quantum efficiency of quantum dot-based TPVs can approach 100%. Losses in the practical efficiency of a TPV can arise when transporting the separated charges (an electron-hole pair) to the electrodes; there are also losses sustained on getting the photons into the TPV material, e.g., reflection, etc. Transport-related losses can include ohmic losses and, because transport takes time, losses from recombination. Recombination is a process in which the electron-hole pair is extinguished and its energy transferred to other energy holding systems. One alternative, radiative recombination, results in the emission of a photon of the same energy as was absorbed. This is generally harmless to the system efficiency so long as the design can re-absorb that photon at some other location. In a potentially deleterious form of radiative recombination, Raman scattering spawns photons of a lesser energy which, eventually, can be lost to heat because no structure in the TPV is tuned to absorb them as a charge separation. Raman scattering can be mitigated or essentially zeroed in TPVs by careful design of the quantum dots, i.e., by eliminating modes that allow Raman behavior. An undesirable form of recombination is that where the energy from the extinguished charge is absorbed by the material as heat as a phonon. The probability of phonon generation is partially a function of the transport distance of the charge; the longer the transport distances the more time and opportunity there is for interactions that result in recombination. Much of the loss may be circumvented, if transport distances and transport time are reduced or eliminated, despite that charge transport is the very mechanism by which energy is carried out of the TPV to do useful work.

In one aspect of the present disclosure, circumventing charge transport can be accomplished or facilitated by an alternative approach, field coupling, to extract energy from a TPV. For such field coupling, extraction of energy can occur via RF, electromagnetic induction, or similar effect.

Figure 4:
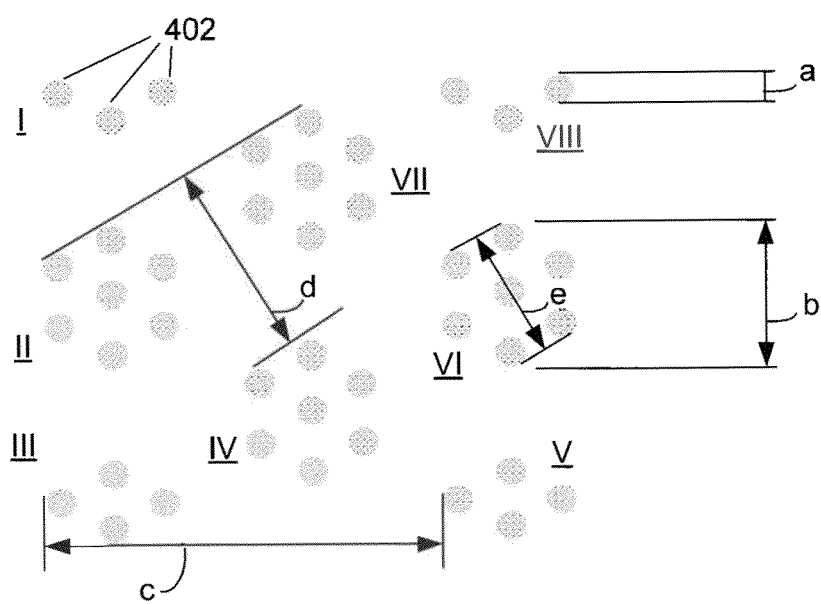
FIG. 4 depicts a diagrammatic view of an array of a number of quantum dots in a thermo-photovoltaic cell material, in accordance with exemplary embodiments of the present disclosure.

FIG. 4 shows a diagram 400 of one of virtually infinite different possible designs for quantum dot arrays that support bi-resonance (two resonant frequencies), which is utilized for embodiments of the present disclosure. In the example shown in FIG. 4, eight groups (I-VIII) of quantum dots 402 are each configured in hexagonal arrays with six quantum dots 402 on the vertices of a hexagon and a single quantum dot 402 at the center. The diameter or representative dimension of the quantum dots 402 is shown (a). The major and minor axes of a group (e.g., VI) are also shown (b and e, respectively). Pitch distances between rows of groups are also shown (c and d). Of course, while hexagonal groupings are shown, virtually any other shape of groping may be utilized.

By adjusting the design of the individual quantum dots 402, they can be tuned to incoming IR radiation, while adjusting the number of quantum dots per group and their spacing, the array can be tuned to the desired RF frequency—thus achieving bi-resonance. For a MMIC-TPV pair, e.g., as shown in FIG. 2, the MMIC can function as a ready source of RF, which can be coupled into a QD-TPV by judicious design of the elements of components so they act together as a resonant couple. That is, the RF can be used as the forcing function in a resonator. The RF field can then cause the quantum dot (or a system of quantum dots) to oscillate and the trapped electron-hole pair(s) along with it.

For an efficient coupling of the RF energy into quantum dots, the natural frequency of the quantum dots is preferably the same as the transmitter (e.g., MMIC) frequency. In general, this will not be the case as the natural frequency of any structure is inversely proportional to its characteristic length; meaning that a structure tuned for IR (e.g., THz) frequencies will not also resonate at microwave (e.g., GHz) frequencies. Thus, it is preferable that structures or groupings of quantum dots are engineered to resonant together, as a whole, at the desired frequencies (e.g., GHz). So that the grouping resonates at microwave frequencies while the individual quantum dots resonate at the IR frequencies. Experiments have shown that QDs groupings can resonate at the microwave frequencies. Because coupling between QDs is regulated by the distance them (among other variables), groups of QDs can be made to resonate at design frequency by adjusting the spacing between QDs. As shown in 4, the size (a) of the quantum dots 402, as well as the distances (b)-(d) across features of the groups (I-VIII) can be engineered and fabricated as desired.

Electron-hole pairs are created when IR photons from the energy source are absorbed by the quantum dots comprising the TPV. The effect of the coupled in RF field on the IR field is negligible because photons, whether IR or RF, are electrically neutral and do not interact strongly with the RF field, if at all. Once the photonic energy has been transformed into a charge pair, however, the situation is very different. The charged pair stores the photonic energy as a charge separation under the Coulomb Law: potential energy stored is inversely proportional to the charge separation distance. However, the amount of energy stored in a quantum dot is not a simple application of Coulomb's because there are many other fields intrinsic to the quantum dot design and its working principles and Coulomb's Law requires that all of them be brought within the equation. Consequently, as a short cut, most scientists talk in terms of energy levels of the quantum dots rather than meters of separation distance.

An aspect of the present disclosure provides that that the quantum dots or a QD-TPV support many energy levels. In exemplary embodiments, the number of QD energy levels required for a QD-TPV is (at preferably a minimum value)

$$\frac{E_{IR}}{E_{RF}} = \frac{\frac{c}{\lambda} \cdot \hbar}{f \cdot \hbar} = \frac{c}{\lambda \cdot f} = \frac{f_{IR}}{f_{RF}},$$

where the energy of the incoming IR photon is $$E_{IR} = \frac{c}{\lambda} \cdot \hbar$$

(where c is the speed of light, $\lambda$ is the wave length of the IR, and $\hbar$ is the reduced Plank constant) and the energy of the RF photon desired is $E_{RF}=f \cdot \hbar$ (where f is the design microwave frequency). Since microwave frequencies are typically in the GHz range and IR is the THz range, the number of energy levels required is typically on the orders of thousands. Preferably, these energy levels should be equally spaced (that is, defined by $E_n = n \cdot x + E_{Gnd}$ where $E_n$ is the energy of the $n^{th}$ level and x is the energy increment between allowable levels. This should not pose a problem with a quantum dot structure; in fact the experiments have shown that a virtually infinite number of allowable levels can be created (actually exactly infinitely many levels is not an allowable structure, but can be approached by any of several strategies that widen the bandwidth of the quantum dots and their groups).

Figure 5:
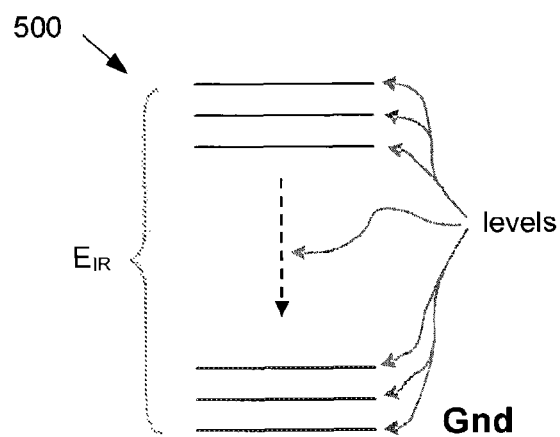
FIG. 5 depicts a representative energy level diagram, in accordance with exemplary embodiments of the present disclosure.

FIG. 5 shows a notional energy structure diagram 500 of a QD-TPV, in accordance with exemplary embodiments of the present disclosure. The RF actually emitted can be restricted to that which is driven by the transmitter, e.g., radar MMIC transmit module 212, so that a near infinite allowable energy level structure is an advantage because it means that the device can be tuned to many different frequencies and the bandwidth may be controlled externally. The result of this arrangement is that the TPV can act as if it were an amplifier (at the resonant frequency) of the RF output.

Exemplary embodiments of the present disclosure may utilize QD-TPVs including QD materials disclosed in any of the following: U.S. Pat. No. 6,605,772; U.S. Pat. No. 6,452,206; U.S. Pat. No. 6,444,896; U.S. Pat. No. 6,060,657; U.S. Pat. No. 6,060,656; U.S. Pat. No. 5,900,071; and U.S. Pat. No. 5,415,699; the entire contents of all of which are incorporated herein by reference. An exemplary material can include a QD-based material including a quantum dot superlattice including an alloy of lead, selenium, and tellurium in layers of lead telluride.

Figure 6:
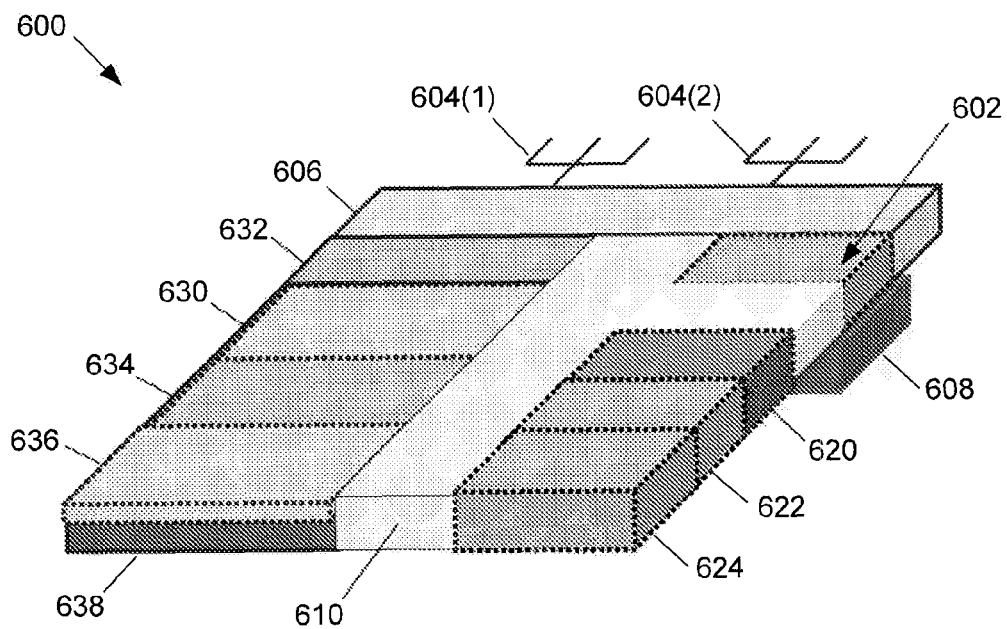
FIG. 6 depicts a perspective diagrammatic view of an integrated transmit-receive module utilizing a TPV, in accordance with an exemplary embodiment of the present disclosure.

FIG. 6 depicts a MMIC TR module 600, in accordance with exemplary embodiments of the present disclosure. Module 600 includes two radiators, or antennas, 604(1)-604(2) configured to transmit RF power received from high-power amplifier 602. Amplifier 602 and antennas 604(1)-604(2) are configured to transmit RF power/energy of a desired microwave frequency bandwidth, e.g., X band, K band, Ku band, Ka band, etc. Module 600 can also be configured to receive RF energy via radiators 604(1)-604(2) and act as a receiver. Duplexer 606 facilitates switching between transmit and receive modes of operation. Waste heat harvester including a TPV 608 is configured adjacent high power amplifier 602, and can include a suitable TPV or thermo-photovoltaic material. Thermal separator 610, made of a suitable thermal insulating material, can be positioned to separate the high-power amplifier 608 from other module components, e.g., ones utilized for receive functions.

Continuing with the description of FIG. 6, module 600 can include a low-noise amplifier (LNA) 630, a LNA circuit protection block 632, and one or more signal logic blocks 634-636 for receive functionality. As shown, a solid state cooler 638, e.g., a Peltier cooler, may be disposed adjacent a signal logic block 636 for cooling the signal logic block 636. Cooling the signal logic block of the receiver portion of the module 600 can improve the SNR of the module 600. Module 600 may also include a variable gain amplifier 620 and a controllable phase shifter 622, e.g., for transmit functionality. A thermal control logic block 624 may also be included, e.g., for controlling electrical power received from the waste heat harvester 608 as applied to solid state cooler 638. A photonic crystal (not shown) may optionally be used with the TPV 608 to facilitate heat transfer. Such crystals may be used to tune the spectrum of the waste heat to better match the input requirements of the TPV 608. Examples of suitable photonic crystals include but are not limited to stacked arrays of tungsten filaments, e.g., as disclosed in U.S. Pat. No. 6,583,350, the entire contents of which are incorporated herein by reference.

In exemplary embodiments, TPV 608 can be configured closely adjacent to the high-power amplifier 608 without necessarily touching it. Any suitable separation distance can be used. For example, the separation distance can range from a few nanometers to a few millimeters. Smaller separation distances are preferable as they may promote heat transfer, e.g., by photon tunneling via evanescent states.

Figure 7:
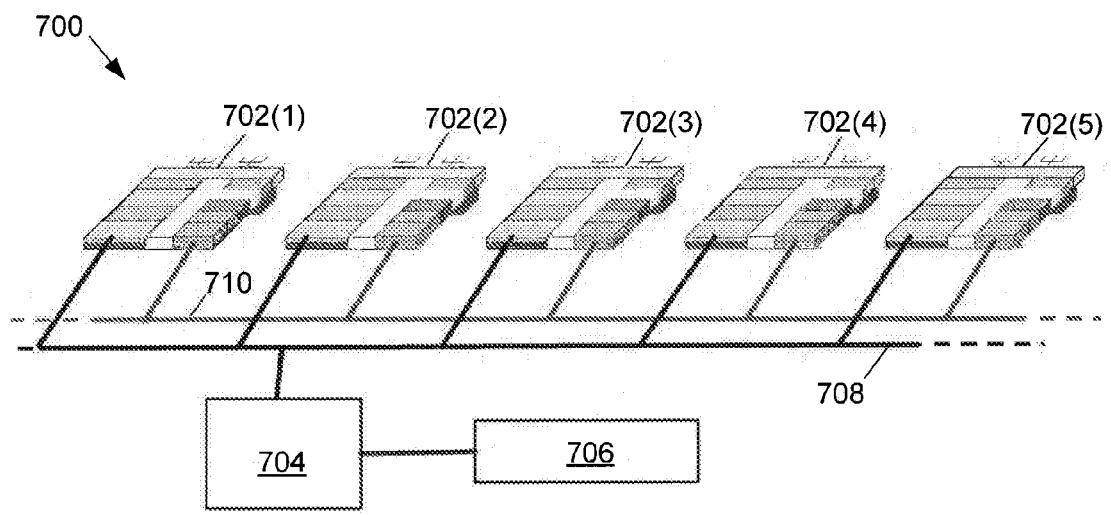
FIG. 7 depicts multiple an array of transmit-receive modules connected to computer and display system, in accordance with exemplary embodiments of the present disclosure.

FIG. 7 depicts a TR system 700 including an array of MMIC TR modules configured to function as an array antenna, in accordance with exemplary embodiments of the present disclosure. System 700 includes multiple MMIC TR modules 702(1)-702(5), which may be similar to module 600 as shown and described previously for FIG. 6. Modules 702(1)-702(5) may be connected to a suitable beam steering and wave form synthesizer computer 704 by a signal feed bus 708. Beam steering and wave form synthesizer computer 704 may be connected to a suitable display driver computer and display 706 by a suitable connection as shown. Modules 702(1)-702(5) can also be connected by and receive suitable power from a power feed bus 710 for distribution of power, as shown.

An exemplary application of the power aperture linearization in accordance with the present disclosure is for the improvement of solar cell efficiency. As solar cells can naturally radiate RF energy, efficiency of the solar cell system may be improved by blocking the RF radiant pathway, e.g., with a reflector, and retaining the RF energy within a resonant cavity, instead of permitting the system to radiate RF. If the optical frequency input pathway remains unblocked, however, optical energy (solar radiation, or earthshine, etc.) can continue to energize the system. The energy that would have escaped as RF can then be used, instead, directly as electric power to do work.

Figure 8:
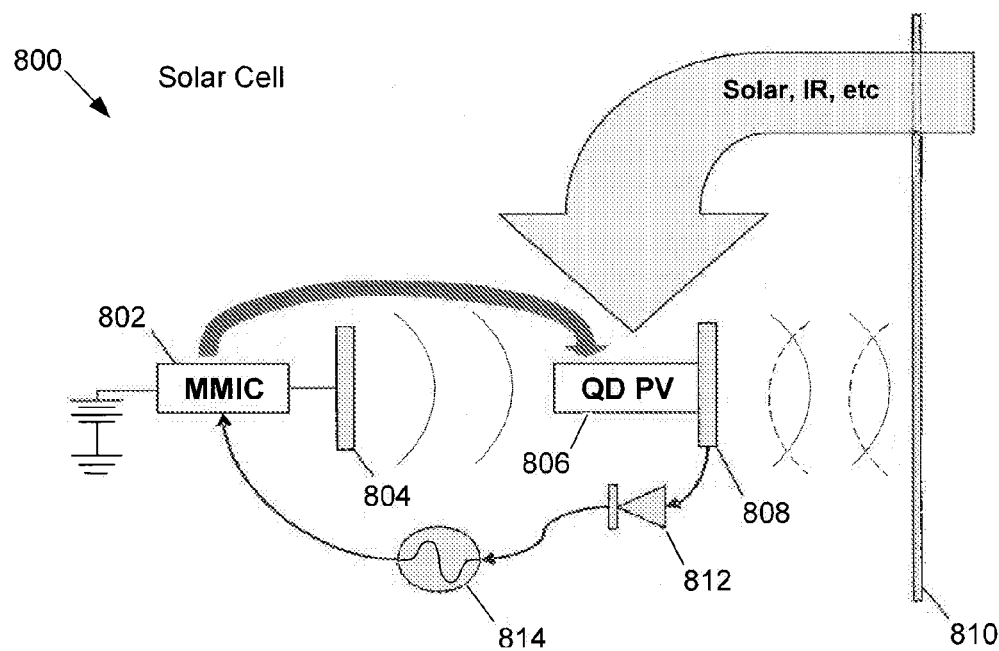
FIG. 8 depicts a circuit diagram of a solar cell acting as a MMIC and TPV system operational as an RF transmitter and including a reflector, in accordance with exemplary embodiments of the present disclosure.

FIG. 8 depicts a circuit diagram of a solar cell 800 acting as a MMIC and TPV system operational as an RF transmitter and including a reflector, in accordance with exemplary embodiments of the present disclosure. Solar cell 800 can include a photodiode of suitable semiconductor materials. As shown in the diagram, a photodiode can be considered as a MMIC 802 and a TPV 806 that can radiate RF energy. TPV 806 (of the solar cell) can be or include a QD-TPV material. TPV 806 can be configured to receive RF energy and/or waste heat from the MMIC 804, as indicated. Radiating elements 804 and 808 are shown to indicate the transmitting and receiving functionalities of the MMIC 804 and TPV 808. A RF reflector 810 can be present to facilitate retaining the RF energy, e.g., within a resonant cavity surrounding or partially surrounding system 800. Reflector 810 can be part of or itself form a resonant cavity that can surround or partially surround the solar cell (MMIC and TPV 806). TPV 808 can supply useful electricity to the MMIC via a diode 812 or other suitable regulation device. The RF energy that would have escaped as RF, can be used as electric power to do work, e.g., through load 814.

Accordingly, embodiments of the present disclosure can provide benefits and advantages. The efficiency of radar transmit and TR modules can be increased. More effective heat rejection can be realized at lower weight. Receiver noise and noise bandwidth can be reduced. Moreover, the aperture of an antenna can be increased without leading to an increase in power requirements.

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

While exemplary embodiments have been described as utilizing TPV materials that include quantum dot structures and materials, other suitable TPVS structures and materials may be used within the scope of the present disclosure. For example, exemplary embodiments of the present disclosure may utilize TPVs having quantum sheet, barrier, or wire structures including TPV materials disclosed in U.S. Pat. No. 7,838,760; U.S. Pat. No. RE41,801; U.S. Pat. No. 7,679,203; U.S. Pat. No. 7,638,705; U.S. Pat. No. 7,342,169; and U.S. Pat. No. 7,235,735; the entire contents of all of which are incorporated herein by reference. Further suitable TPV materials including nanostructures are disclosed in U.S. Patent Application Publication No. 2101/0059723; the entire contents of which are incorporated herein by reference. Other TPV materials, e.g., such as fibers or sheets of carbon nanotubes, may be used for embodiments of the present disclosure. Suitable TPV materials are made commercially available, e.g., by Nextreme Thermal Solutions, Inc. of 3980 Patriot Dr. Suite 140, Durham, N.C. 27703.

Moreover, while exemplary embodiments have been described as not requiring or including a heat sink such as a heat spreader, other embodiments can include use of such heat sink systems.

In reading the present disclosure, one skilled in the art will appreciate that embodiments of the present disclosure can be implemented in hardware, software, firmware, or any combinations of such, and over one or more networks. Suitable software can include computer-readable or machine-readable instructions for performing methods and techniques (and portions thereof). Any suitable software language (machine-dependent or machine-independent) may be utilized. Moreover, embodiments of the present disclosure can be included in or carried by various signals, e.g., as transmitted over a wireless RF or IR communications link or downloaded from the Internet.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

What is claimed is:

1. An antenna system comprising:
   a transmit module configured to transmit RF energy of a selected frequency bandwidth;
   a heat harvester including a thermophotovoltaic (TPV) material configured to receive waste heat from the transmit module and convert the waste heat to electricity;
   a receiver module; and
   a cooling unit configured to cool the receiver module.

2. The antenna system of claim 1, wherein the TPV comprises a quantum-effect material.

3. The antenna system of claim 2, wherein the quantum-effect material comprises a quantum dot (QD)-based material.

4. The antenna system of claim 3, wherein the QD-based material comprises a quantum dot superlattice comprising an alloy of lead, selenium, and tellurium in layers of lead telluride.

5. The antenna system of claim 3, wherein the QD-based material comprises a plurality of groupings of quantum dots, and wherein each grouping is configured to resonate at microwave frequencies and each quantum dot of a respective grouping is configured to resonate at infrared frequencies.

6. The antenna system of claim 1, wherein the transmit module comprises a monolithic microwave integrated circuit (MMIC).

7. The antenna system of claim 6, wherein the MMIC comprises a high-temperature semiconductor.

8. The antenna system of claim 7, wherein the high-temperature semiconductor comprises silicon carbide (SiC).

9. The antenna system of claim 7, wherein the high-temperature semiconductor comprises aluminum nitride (AlN).

10. The antenna system of claim 7, wherein the high-temperature semiconductor comprises gallium nitride (GaN).

11. The antenna system of claim 7, wherein the high-temperature semiconductor comprises indium nitride (InN).

12. The antenna system of claim 1, further comprising a plurality of antenna elements having a combined aperture area, A.

13. The antenna system of claim 1, further comprising a photonic crystal is disposed between the transmit module and the TPV.

14. The antenna system of claim 13, wherein the wherein the photonic crystal comprises tungsten.

15. The antenna system of claim 13, wherein the photonic crystal comprises a stacked array of tungsten elements.

16. The antenna system of claim 1, wherein the receiver module is configured to receive radiation of a selected frequency bandwidth.

17. The antenna system of claim 1, wherein the cooling unit is configured to receive power from the TPV.

18. The antenna system of claim 1, wherein the cooling unit comprises a Peltier cooler.

19. An array antenna system comprising:
   a plurality of radiators configured to transmit RF energy of a selected frequency bandwidth;
   a transmit module configured to provide RF energy of a selected frequency bandwidth to the plurality of radiators;
   a receive module including a cooling unit and configured to receive RF radiation of a selected frequency bandwidth from the plurality of radiators, wherein the cooling unit is configured to cool the receive module; and
   a heat harvester including a thermophotovoltaic (TPV) material configured to (i) receive waste heat form the transmit module and convert the waste heat to electricity, and (ii) provide the resulting electricity to the cooling unit.

20. The array antenna system of claim 19, wherein the TPV material comprises a quantum-effect material.

21. The array antenna system of claim 20, wherein the quantum-effect material comprises a quantum dot (QD)-based material.

22. The array antenna system of claim 21, wherein the QD-based material comprises a quantum dot superlattice comprising an alloy of lead, selenium, and tellurium in layers of lead telluride.

23. The array antenna of claim 21, wherein the QD-based material comprises a plurality of groupings of quantum dots, wherein each grouping is configured to resonate at microwave frequencies and each quantum dot of a respective grouping is configured to resonate at infrared frequencies.

24. The array antenna system of claim 20, wherein the quantum effect material comprises a carbon nanotube material.

25. The array antenna system of claim 20, wherein the quantum effect material comprises graphene.

26. The array antenna system of claim 19, wherein the transmit module comprises a monolithic microwave integrated circuit (MMIC).

27. The array antenna system of claim 26, wherein the MMIC comprises a high-temperature semiconductor.

28. The array antenna system of claim 27, wherein the high-temperature semiconductor comprises silicon carbide (SiC).

29. The array antenna system of claim 27, wherein the high-temperature semiconductor comprises aluminum nitride (AlN).

30. The array antenna system of claim 27, wherein the high-temperature semiconductor comprises gallium nitride (GaN).

31. The array antenna system of claim 27, wherein the high-temperature semiconductor comprises indium nitride (InN).

32. A solar cell comprising:
   a photodiode configured to (i) receive infrared radiation of a selected frequency bandwidth and convert the infrared radiation to electricity, and (ii) transmit RF energy of a selected frequency bandwidth; and
   a RF reflector forming at least part of a resonant cavity and configured to reflect RF energy from the photodiode, wherein the RF reflector is transparent to infrared radiation.

33. The solar cell of claim 32, wherein the photodiode comprises a QD-based material comprising a plurality of groupings of quantum dots, wherein each grouping is configured to resonate at microwave frequencies and each quantum dot of a respective grouping is configured to resonate at infrared frequencies.

* * * * *